United States Patent [19]

Weaver

[11] Patent Number: 5,405,160
[45] Date of Patent: Apr. 11, 1995

[54] TRAILER HITCH ATTACHMENT APPARATUS

[76] Inventor: David A. Weaver, HCR 56 Box 844, John Day, Oreg. 97845

[21] Appl. No.: 898,962

[22] Filed: Jun. 10, 1992

[51] Int. Cl.⁶ .............................................. B60D 1/38
[52] U.S. Cl. ................................... 280/477; 280/480
[58] Field of Search ................. 280/477, 478.1, 479.1, 280/480

[56] References Cited

U.S. PATENT DOCUMENTS

| Re. 28,590 | 10/1975 | Salmi | 280/477 |
| 2,988,384 | 6/1961 | Neff | 280/480 |
| 3,526,289 | 9/1970 | Rodgers | 280/479.1 X |
| 3,767,230 | 10/1973 | DeVries | 20/477 |
| 4,205,453 | 6/1980 | Steele | 280/477 X |
| 4,974,866 | 12/1990 | Morgan | 280/477 |
| 5,000,471 | 3/1991 | Sumrall | 280/477 |
| 5,009,445 | 4/1991 | Williams, Jr. | 280/477 |
| 5,072,962 | 12/1991 | Webb | 280/477 |
| 5,080,386 | 1/1992 | Lazar | 280/477 |
| 5,085,408 | 2/1992 | Norton et al. | 280/477 |

FOREIGN PATENT DOCUMENTS

| 1022099 | 3/1955 | Germany | 280/477 |
| 1203036 | 10/1965 | Germany | 280/477 |
| 0477180 | 12/1937 | United Kingdom | 280/477 |
| 9010550 | 9/1990 | WIPO | 280/477 |

Primary Examiner—Brian L. Johnson
Assistant Examiner—Peter English
Attorney, Agent, or Firm—William A. Birdwell & Associates

[57] ABSTRACT

An apparatus and method for attaching a trailer to a vehicle. An apparatus is provided having a winch attached to the trailer for pulling the trailer to the vehicle, a substantially flat strap connected to the winch at one end and having a flat attachment member with an aperture therethrough at the other end for placement over the ball portion of a hitch at the other end for connecting the trailer to the vehicle, and a multi-position arm attached to the trailer forward of the winch for lifting the receiver portion up and over the ball portion of the hitch when the strap is effectively shortened by winding it up on the winch. The arm is pivotally attached at one end by a block on the underside of the tongue of the trailer. A bearing member is disposed at the other end of the arm. The arm may be moved backward to a first-position and pinned in place so that it is tucked underneath the tongue for storage. To connect the trailer to or release it from the vehicle, the arm is locked into a second position so that it extends downward, the connector on the end of the strap is placed over the ball on the vehicle, and the winch is cranked so that the trailer is lifted up by the arm on the strap.

22 Claims, 8 Drawing Sheets

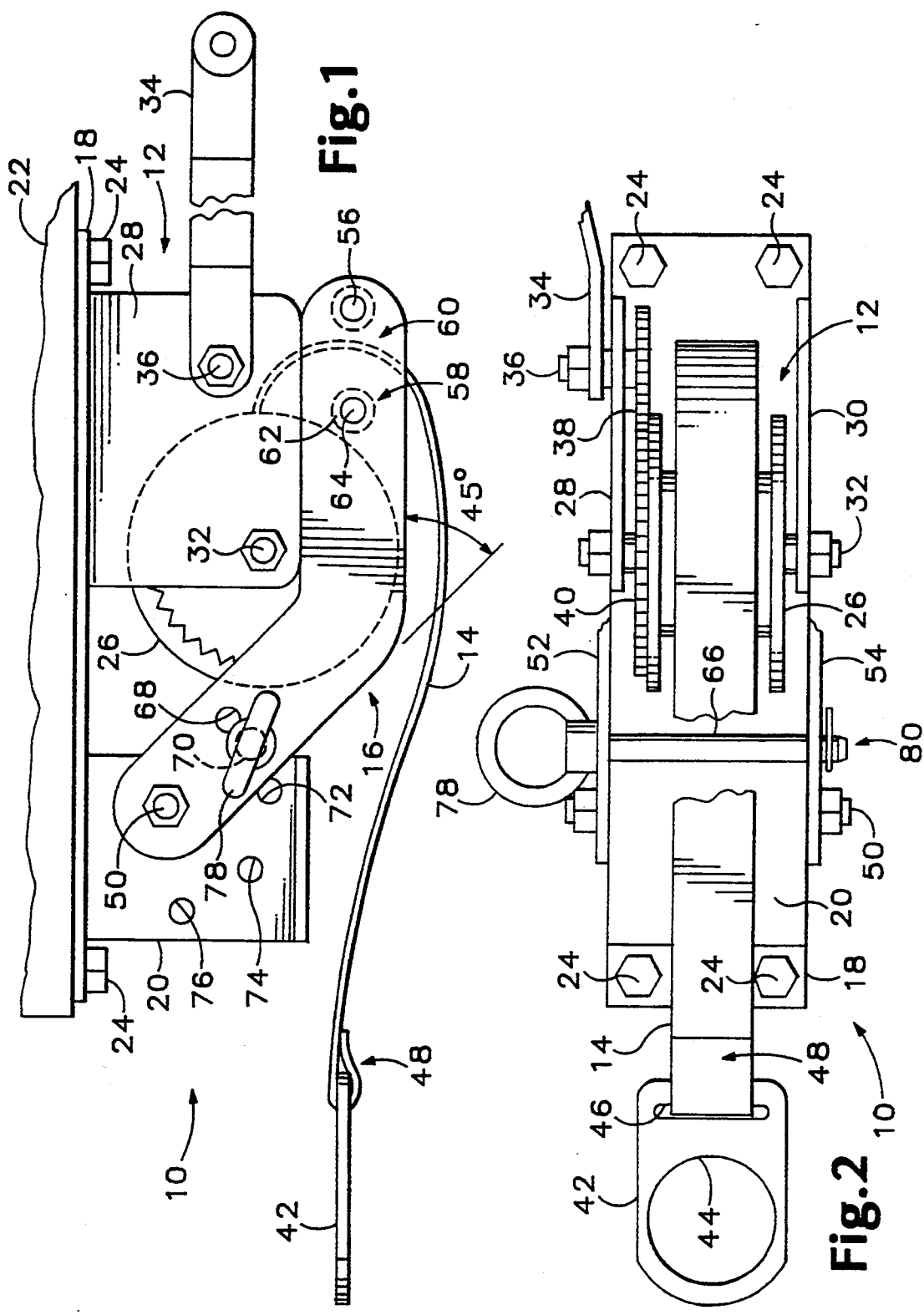

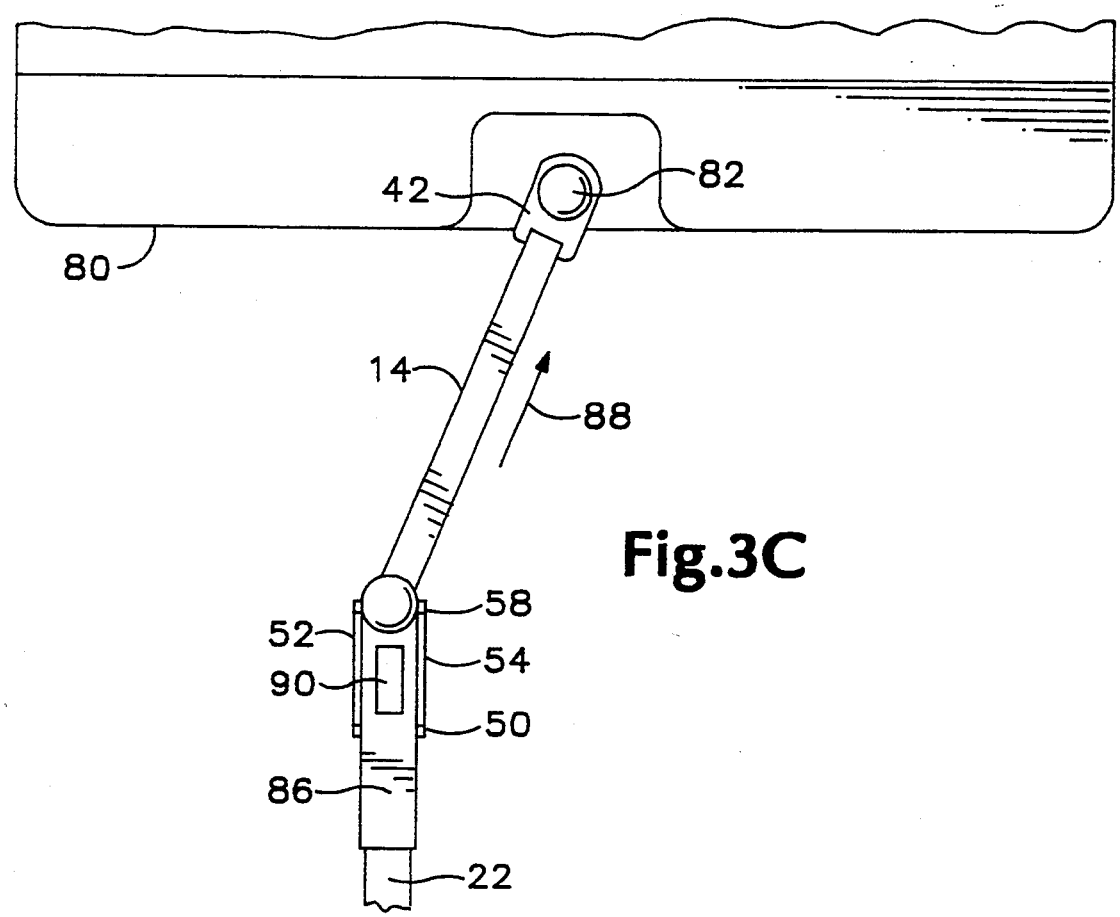
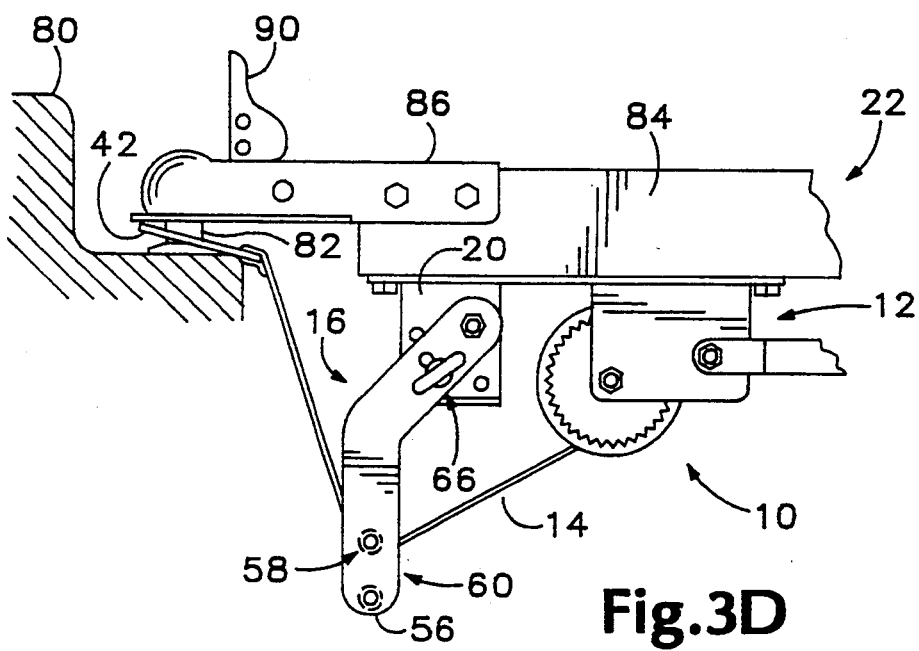

TRAILER HITCH ATTACHMENT APPARATUS

BACKGROUND OF THE INVENTION

This invention relates to apparatuses and methods for hitching a trailer to a vehicle, and particularly to devices for making it easier to bring a trailer and vehicle hitch, connect them together and thereafter disconnect them.

In the use of vehicle trailers, for example, boat trailers, horse trailers and recreational house trailers, the trailer hitch typically comprises a first portion mounted on the vehicle, ordinarily a ball, and a second portion mounted on the tongue of the trailer, known as a receiver there the first portion is a ball. The first portion connects the second portion to hitch the trailer; in the case there the first portion is a ball, the receiver fits over the ball to hitch the trailer to the vehicle.

One of the problems in hitching a trailer to a vehicle is that it may be difficult, because of the terrain there the trailer is parked, to back the vehicle right up to the tongue of the trailer there the receiver is attached. Another difficulty is that, even if the terrain permits the driver to bring the rear of the vehicle in proximity with the tongue of the trailer, it is difficult for the driver to align the first portion of the hitch with the second portion of the hitch laterally. A third difficulty, particularly associated with a ball and receiver type hitch, is that the weight of the trailer often requires the tongue to be lifted by a jack in order to place the receiver over and on top of the ball.

Partial solutions to these problems have previously been developed. For example, hand crank winches mounted on a trailer for pulling the trailer to the vehicle using a rope or cable attached to the winch are disclosed in Norton et al. U.S. Pat. No. 5,085,408, International Patent Publication No. WO 90/10550 and German Patent No. 1,022,099. However, none shows an adequate means for aligning the trailer hitch receiver with the trailer hitch ball. Norton et al. also shows a hand crank trailer jack attached to the trailer. However, this requires the coordinated operation of two hand cranks, that is, the crank for the winch and the crank for the jack. Lazar U.S. Pat. No. 5,080,386 shows a plate assembly associated with the ball portion of a trailer hitch for guiding the receiver portion up and over the ball portion of a trailer hitch assembly. However, it shows no means for providing the lifting force or the force for pulling the trailer forward toward the vehicle.

Accordingly, there is a need for an improved means for making it easier to pull a trailer and vehicle together, align the portion of the trailer hitch on the trailer with the portion on the vehicle and, in the case of a ball and receiver type hitch, raise the receiver portion over and on to the ball portion for attachment thereto, and release the receiver portion from the ball portion in order to disconnect the trailer.

SUMMARY OF THE INVENTION

The present invention overcomes the problems of hitching a trailer to a vehicle by providing a novel combination of a winch attached to the trailer for pulling the trailer to the vehicle, a substantially flat strap connected to the winch at one end and having a flat attachment member with an aperture therethrough at the other end for placement over the ball portion of a hitch at the other end for connecting the trailer to the vehicle, and a multi-position arm attached to the trailer forward of the winch for lifting the receiver portion up and over the ball portion of the hitch when the strap is effectively shortened by winding it up on the winch. In one embodiment, the winch is attached underneath the tongue of the trailer and the arm is pivotally attached at one end by a block on the underside of the tongue of the trailer forward of the winch. A bearing member is disposed at the other end of the arm, the bearing member comprising a guide at the end of the arm and a roller disposed inwardly from the end forming a slot between it and the guide for receiving the strap. The arm may be pivoted backward toward the winch and pinned in place so that it is tucked underneath the tongue for storage.

To attach the trailer to the vehicle, the arm is pivoted and locked into a second position so that it extends downward, and the connector on the end of the strap is placed over the ball on the vehicle. The winch is cranked so that, as the length of strap between the trailer and the vehicle is shortened, the trailer is pulled toward the vehicle. This causes the trailer to swing laterally so that the receiver portion of the hitch aligns laterally with the ball portion. As the trailer approaches the vehicle, the tautness of the strap pushes upwardly on the arm, which lifts the receiver portion over and above the ball of the vehicle. Once the receiver is in position over the ball, the winch can be released so that the receiver lowers down onto the ball. To remove the trailer from the vehicle, the arm is moved to yet a third position where it extends forward and downward. The winch is then employed to take up slack in the strap, which lifts the receiver off the ball.

In another embodiment, particularly adapted for use with house trailers and vacation house, or "travel", trailers, a substantially vertically-oriented jack is attached to the tongue of the trailer forming a vertical column. In this case, the arm is mounted on the column below the tongue and the winch is mounted on the column above the tongue. The arm is mounted on a pin disposed in a frame by elongate slots which permit the arm to be moved backward and locked into a storage position. For use in attaching or releasing the trailer, the arm is moved forward and locked into one of several positions, essentially as in the embodiment described above.

Therefore, it is a principle object of the present invention to provide a novel and improved apparatus and method for hitching a trailer to a vehicle.

It is another object of the present invention to provide an apparatus and method for hitching a trailer to a vehicle wherein the trailer may be readily pulled to the vehicle using a winch.

It is a further object of the present invention to provide an apparatus and method for hitching a trailer to a vehicle wherein a hitch portion of the trailer is automatically aligned with a hitch portion on the vehicle.

It is yet another object of the present invention to provide an apparatus and method for hitching a trailer to a vehicle using a ball and receiver type hitch wherein the receiver is automatically lifted up and over the ball.

It is yet a further object of the present invention to provide an apparatus and method for hitching a trailer to a vehicle which is particularly adapted for mounting on a house or travel trailer tongue.

The foregoing and other objects, features, and advantages of the invention will be more readily understood upon consideration of the following detailed description of the invention, taken in conjunction with the accompanying drawings.

BRIEF DESCRIPTION OF THE DRAWINGS

FIG. 1 is a side elevation of a first embodiment of a trailer hitch attachment apparatus according to the present invention with guide arms thereof locked in a storage position.

FIG. 2 is a bottom view of the embodiment of the invention shown in FIG. 1 with portions of the guide arm and a winch crank handle cut away.

FIG. 3C is a diagram of the devices of FIG. 3A, viewed from the top, showing how the trailer hitch attachment apparatus of the present invention aligns a trailer with a vehicle.

FIG. 3D is a side elevation of the devices shown in FIG. 3A after the winch has been released so that the receiver portion of the hitch assembly is allowed to drop onto the ball portion of the hitch assembly.

DETAILED DESCRIPTION OF THE INVENTION

Figure 3A:
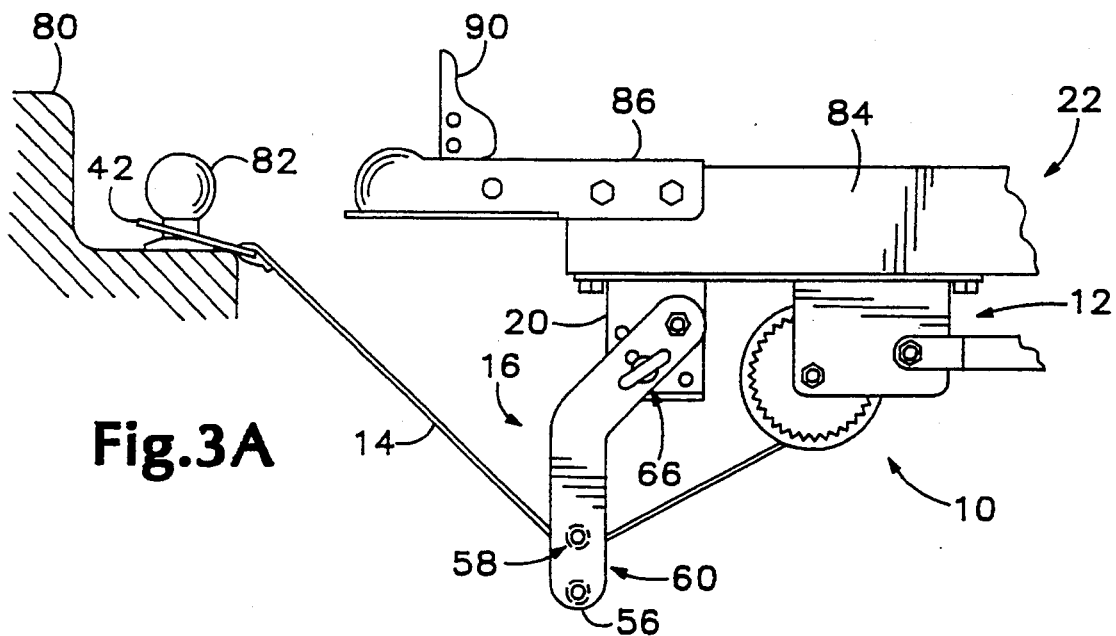
FIG. 3A is a side elevation of a trailer tongue, vehicle, trailer hitch assembly, and the trailer hitch attachment apparatus of FIG. 1 in an initial position preparatory to hitching the trailer to the vehicle.

Referring first to FIGS. 1 and 2, a first embodiment of a trailer hitch attachment apparatus 10 according to the present invention comprises, basically, a winch 12, an elongate, substantially-flat strap 14 attached to the winch for connecting the trailer to a vehicle, and a guide arm 16 which may be positioned to ride on the strap 14 when the strap is connected to a vehicle. The winch 12 is mounted on an attachment plate 18, and the guide arm 16 is pivotally mounted on a block 20 in the shape of a rectangular prism which is, in turn, mounted on the attachment plate 18 forward of the winch toward the front of the trailer. The attachment plate 18 is used to mount the apparatus on the underside of the tongue 22 of a trailer, by bolts 24.

Preferably, the winch 12 is a manual device comprising a spool 26 for holding, and taking up length in, the strap 14. A pair of substantially parallel spool mounting plates 28 and 30 extend downwardly from the attachment plate 18 for supporting the spool on a shaft 32 and a hand crank 34 mounted by a shaft 36. A pair of gears 38 and 40, respectively, connect the hand crank 34 to the spool 26. However, it is to be recognized that other winch assemblies such as an electric winch, or even other devices for taking up length in the strap 14, could be employed without departing from the principles of the invention.

The strap 14 is connected at one end to the spool 26 of the winch 12. At the other end, the strap 14 is connected to a substantially flat, rigid attachment member 42 for attaching the strap 14 to the ball portion of a trailer hitch mounted on a vehicle. The attachment member 42 has a circular aperture 44 defined therein for placement over the ball portion of the hitch. It also has an elongate slot 46 defined therein for receiving the strap 14, which is fed through the slot 46 and attached to itself at point 48. Preferably, the strap 14 is made of nylon, or a similar woven material which is flexible, substantially flat, and strong enough to pull a trailer to a vehicle. Preferably, the attachment member 42 is covered with rubber, or some other soft material which helps to avoid scratching the vehicle, especially where the attachment member is made of metal, which is preferred for strength. This also helps to avoid the attachment member slipping off the ball member when in use.

The arm 16 is pivotally mounted at one end on the block 20 by a shaft 50. The arm comprises two substantially-flat members, 52 and 54, respectively, bent at approximately 45 degrees and disposed substantially parallel to one another. A guide shaft 56 is disposed at the end of the arm 16 opposite the mounting shaft 50. The guide shaft 56 serves to keep the arm members 52 and 54 together and stable, and helps to guide the strap 14 through the arm. A bearing 58 is disposed inside the arm 16 adjacent the guide shaft 56, leaving a slot 60 therebetween through which the strap 14 is fed. Preferably, the bearing comprises a cylinder 62 rotatably mounted on a shaft 64 so that the strap 14 does not rub against a fixed surface when the arm 16 rides on the strap 14.

Figure 3B:
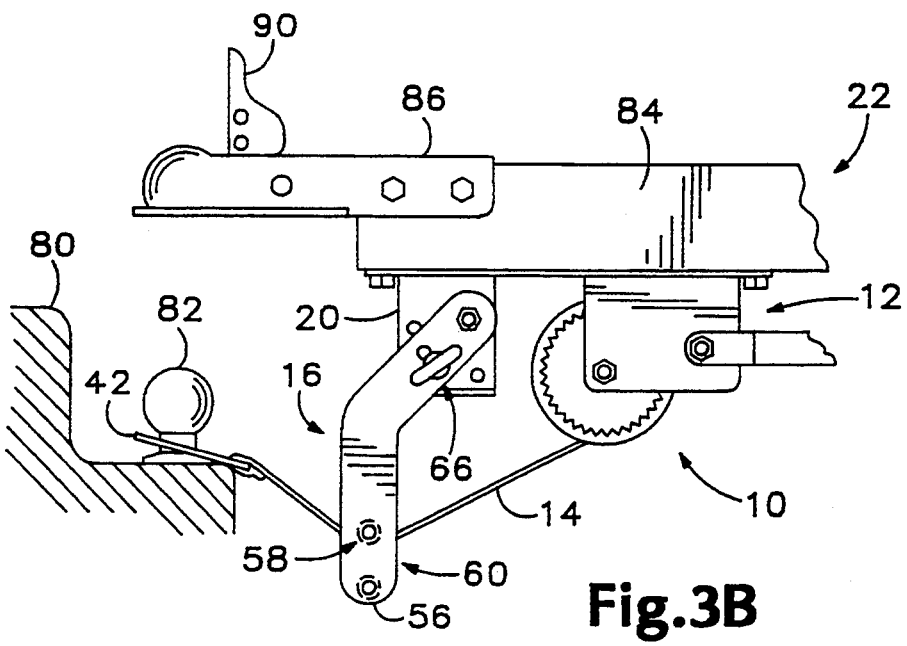
FIG. 3B is a side elevation of the devices shown in FIG. 3A after the winch has been cranked so that a receiver portion of the hitch assembly has been lifted up and over the ball portion by the trailer hitch attachment apparatus.
Figure 4:
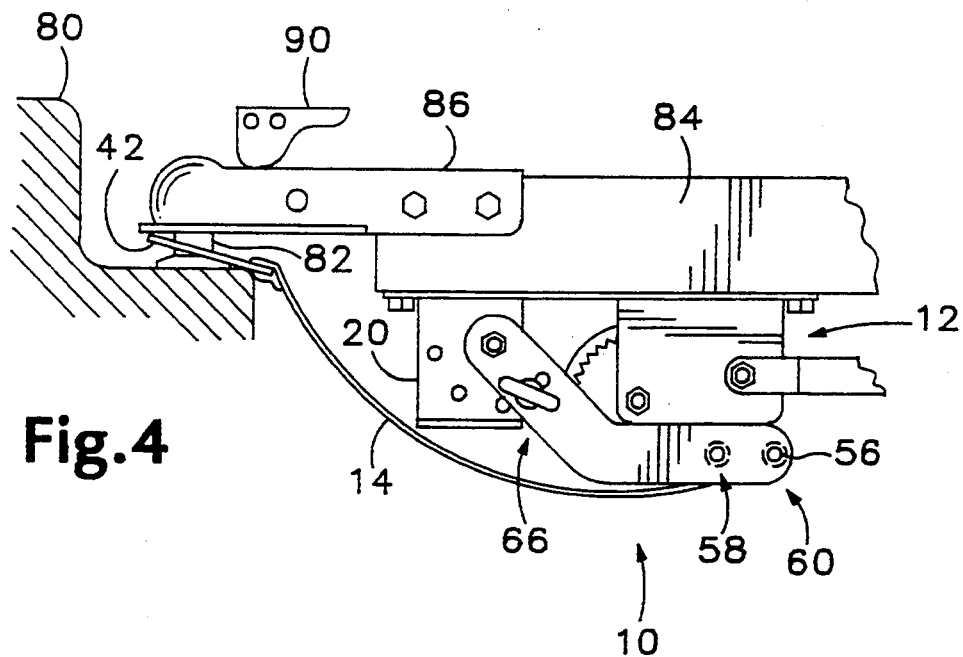
FIG. 4 is a side elevation of the devices shown in FIG. 3A with guide arms of the trailer hitch apparatus locked in a storage position.
Figure 5:
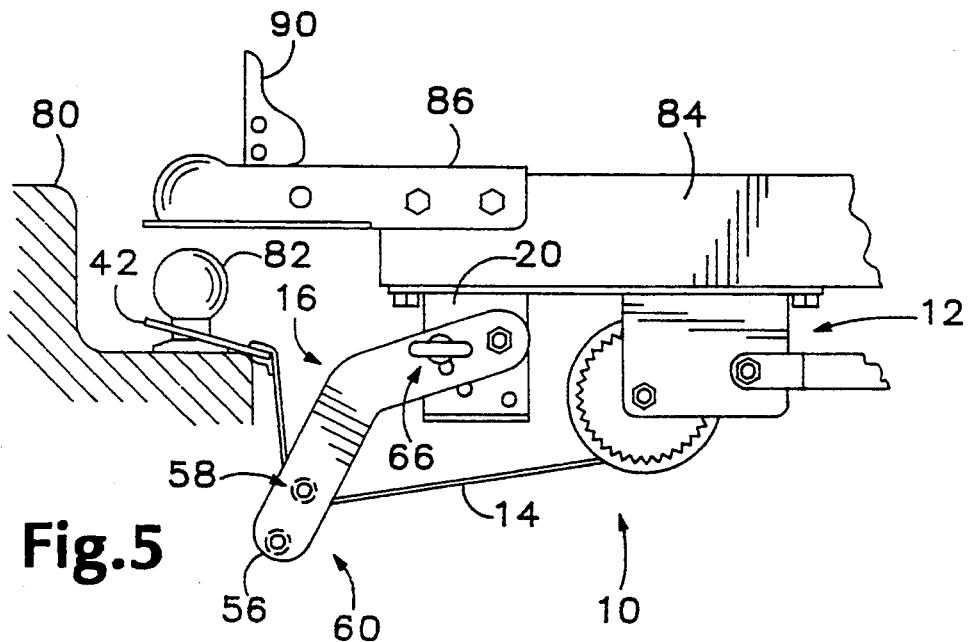
FIG. 5 is a side elevation of the devices shown in FIG. 3A with the guide arms of the trailer hitch attachment apparatus locked in a position for lifting the receiver portion of the hitch assembly off the ball portion when the winch is cranked.

The arm 16 may be placed in a number of different positions. In the embodiment shown, provisions are made for placement of the arm in any of eight specific positions. This is accomplished by placing a locking pin 66 through one of two holes 68 and 70, respectively in each of the arm members 52 and 54, and through one of three holes 72, 74 and 76, respectively, or behind the block 20. The locking pin is equised with a circular handle 78 at one end, and a spring and slot assembly 80 at the other end thereof for holding the pin in place. Basically, however, the arm 16 is adapted to assume one of three positions. First, it may be placed in a storage position, as shown in FIGS. 1 and 4. Second, it may be placed in a downward position as shown in FIGS. 3A, 3B and 3D for guiding a trailer hitch receiver onto a trailer hitch ball, as discussed hereafter. Third, it may be placed in a forward position as shown in FIG. 5 for removing a trailer hitch receiver from a trailer hitch ball, as discussed hereafter. The remaining positions made possible by holes 68 and 70 in the arm members and by holes 72, 74 and 76 in the block 20, are simply to provide adequate variation in the exact position of the arm to accommodate slightly different circumstances.

Turning now to the operation of a trailer hitch apparatus according to the present invention, reference is made to FIGS. 3A, 3B, 3C and 3D. All four Figures show a vehicle 80 having a ball portion 82 of a trailer hitch mechanism mounted thereon, a tongue beam 84 of a trailer to be hitched to the vehicle, a receiver portion 86 of a trailer hitch mechanism for placement on the ball portion 82 and at least a portion of the first embodiment 10 of a trailer hitch attachment apparatus according to the present invention.

Initially, to hitch the trailer to the vehicle, a length of strap 14 is pulled from the winch 12, through the slot 60 and attached to the ball 82 by placing the attachment member 42 over the ball. The arm 16 is placed in its downward position. That is, the locking pin 66 is inserted through one of the two holes 68 and 70 in the arm members and through hole 74 in the block 20. As the winch is rotated to wind up a portion of the strap and thereby reduce the length of strap between the trailer and the vehicle, the bearing 58 of arm 16 rides on the strap. The tautness of the strap pushes the arm 16, and therefore the tongue beam 84 of the trailer, upwardly so that the receiver 86 of the hitch is placed over the ball 82, as shown in FIG. 3B. In addition, where the receiver 86 is out of lateral alignment with the ball 82 on the vehicle 80, the arm 16, which follows the strap 14, guides the receiver 86 into alignment with the ball 82 on the vehicle, as shown by the arrow 88 in the diagram shown in FIG. 3C. Finally, once the receiver 86 is positioned over the ball 82, the winch 12 may be released so as to let out slack in the strap 14, thereby lowering the receiver 86 onto the ball 82, as shown in FIG. 3D.

Turning to FIG. 4, once the receiver 86 is on the ball 82, a lever-type hitch locking mechanism 90, as is commonly known in the industry, is engaged and the arm 16 is swung back into its storage position, with the locking pin 66 behind the block 20, and slack in the strap 14 is taken up by the winch 12. The entire apparatus is thereafter left in place while the vehicle draws the trailer.

To unhitch the trailer from the vehicle, the winch is rotated so as to produce slack in the strap 14 and the arm 16 is placed in its forward position as shown in FIG. 5. That is, the locking pin 66 is placed through one of the two holes 68 and 70 in the arm members and through hole 76 in the block 20. The locking mechanism 90 is disengaged and the winch 12 is rotated to take up slack in the strap 14. This lifts the receiver mechanism 86 off of the ball 82. The receiver and tongue beam 84 may then be swung aside or pushed rearwardly, after which the attachment member 42 may be removed from the ball 82, thereby fully disconnecting the trailer from the vehicle.

Figure 6:
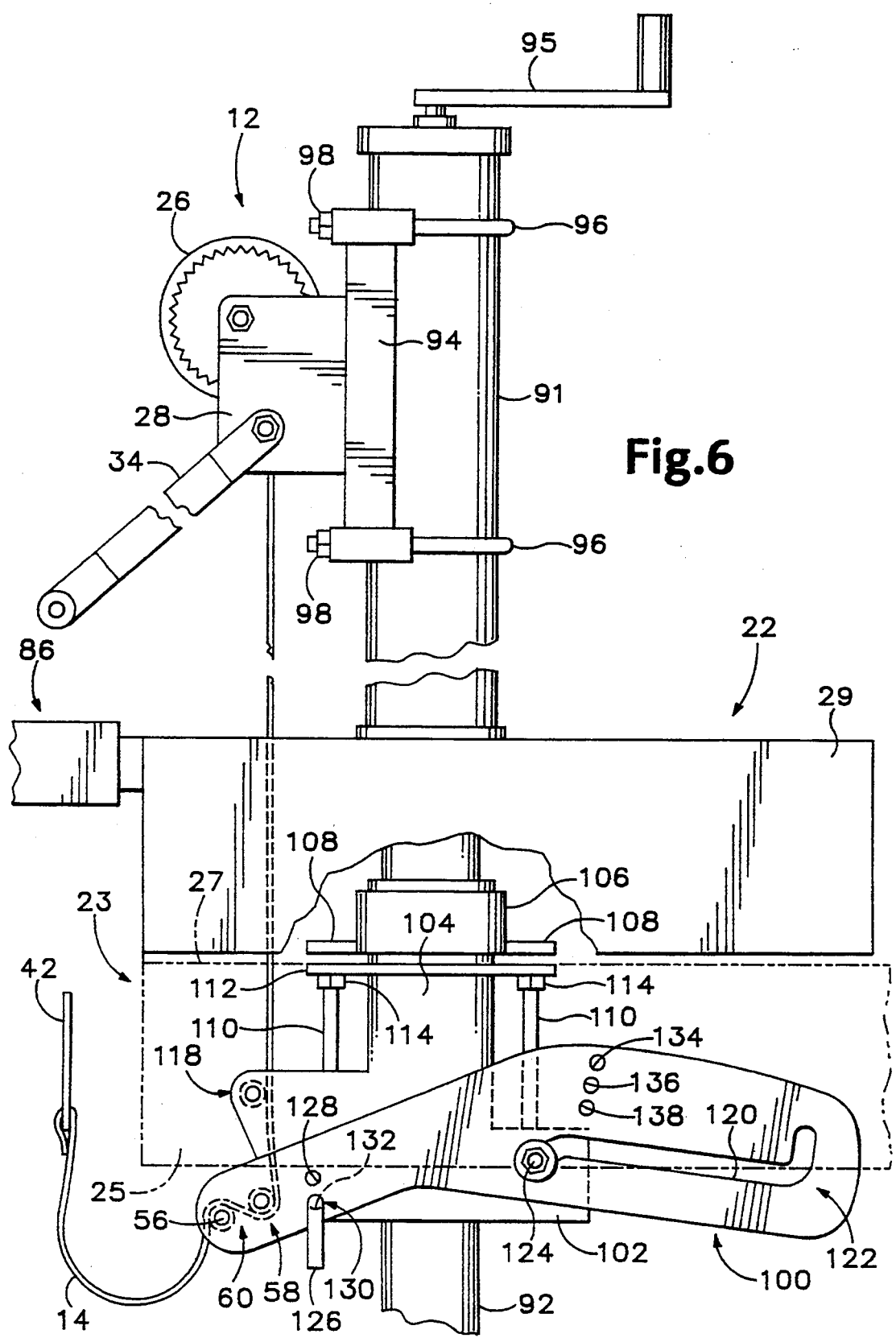
FIG. 6 is a side elevation of a second embodiment of a trailer hitch attachment apparatus according to the present invention with guide arms thereof locked in a storage position.

An alternative embodiment of the trailer hitch attachment apparatus of the present invention is shown in FIG. 6. While the trailer tongue shown in the aforedescribed embodiment is typical of those used with boat trailers, many trailers, particularly horse trailers and vacation home trailers, include a jack 91 which forms a vertical column, as shown in FIGS. 6, 7, 8 and 9, having downwardly-protruding leg 92 with a wheel 93 on the end thereof and crank 95 for raising and lowering the leg. The tongue 22 of this type of trailer is typically formed of a pair of L-shaped beams 23 which come together at a point, thereby forming a V-shaped tongue. Each beam has a vertical side 25 and a horizontal side 27. A second, parallel but shorter pair of L-shaped beams 29 is disposed on beams 23 to support the jack 91 and the receiver 86 of the hitch assembly.

In this embodiment, the winch 12, strap 14 and attachment member 42 are essentially the same as in the aforedescribed embodiment. However, the winch is attached to the jack 91 by a winch mounting plate 94, a pair of U-Bolts 96 and corresponding nuts 98.

While the basic principles of the remaining part of the trailer hitch apparatus according to this embodiment are essentially the same as those for the previous embodiment, the structure is somewhat different. First, a guide arm 100 is mounted on a frame 102 having a tubular column 104 for placement over the leg 92 of the jack 91 such that the leg can move up and down therethrough. The arm mounting frame 102 is supported on the beams 23 of the trailer frame by a sleeve 106 disposed around the tubular column 104, a pair of stubs 108 attached to the ends of respective bolts 110, a V-shaped plate 112 disposed beneath the horizontal sides 27 of the beams 23 and a pair of nuts 114 for fastening this mechanism together. The sleeve 106 and stubs 108 rest on top of the horizontal sides 27 of the beams 23 with the tubular column 104 disposed against the edges thereof, and the V-shaped plate 112 is held tightly against the bottom of the horizontal sides 27 by the nuts 114 tightened on the bolts 110, as shown in FIG. 6. This holds the frame 102 rigidly in place.

As in the previous embodiment, arm 100 has two substantially parallel arm members on opposite sides of the arm support frame 102. One end of the arm 100 includes a guide shaft 56 and a bearing 58, forming a slot 60 therebetween, like the arm 16 of the aforementioned embodiment. In addition, the mounting frame 102 includes a second bearing 118 for guiding the strap 14 downwardly from the winch 12.

Figure 7:
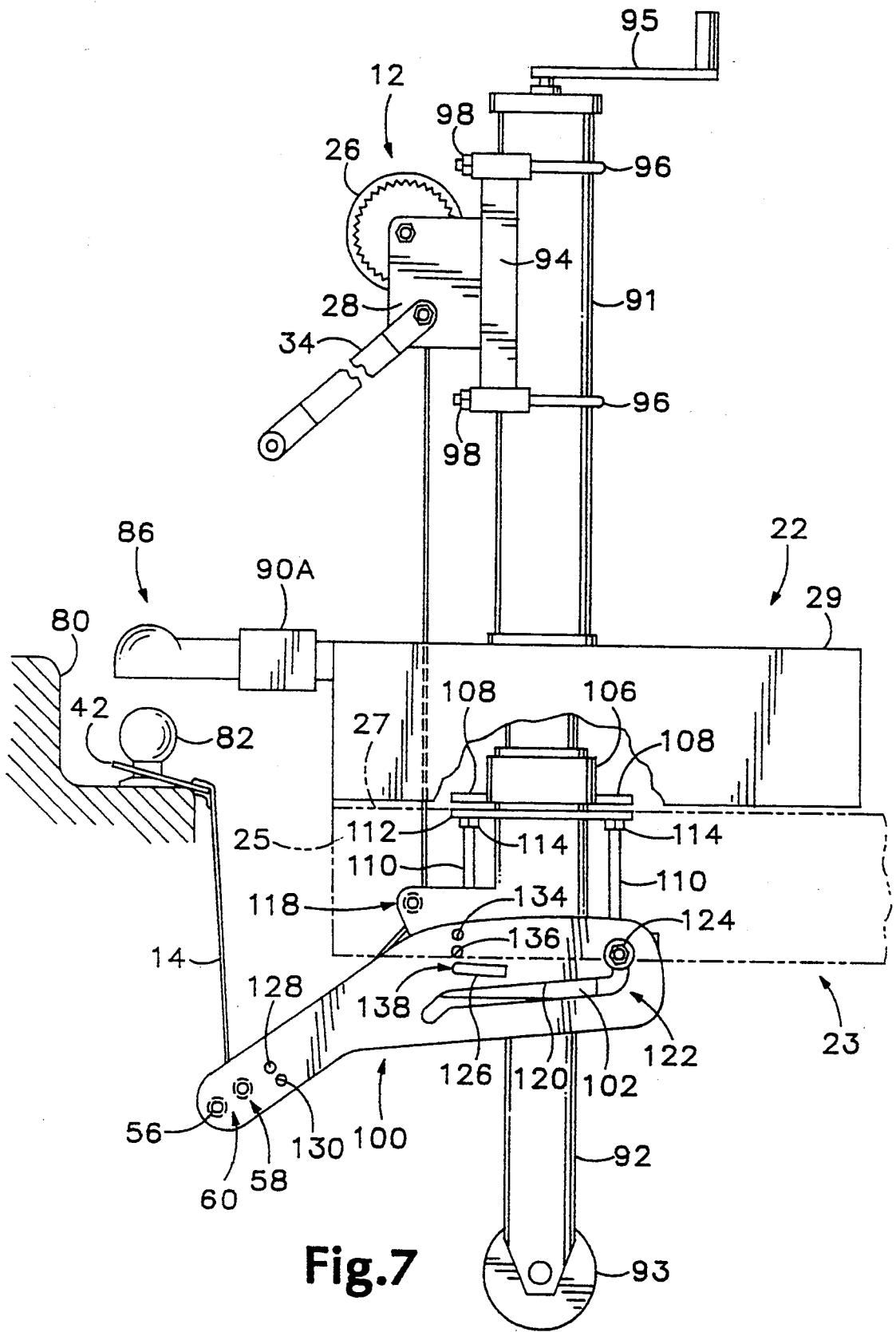
FIG. 7 is a side elevation of the embodiment of the invention shown in FIG. 6 with the guide arms of the trailer hitch attachment apparatus in a position for lifting a receiver portion of a hitch assembly up and over a ball portion thereof.
Figure 8:
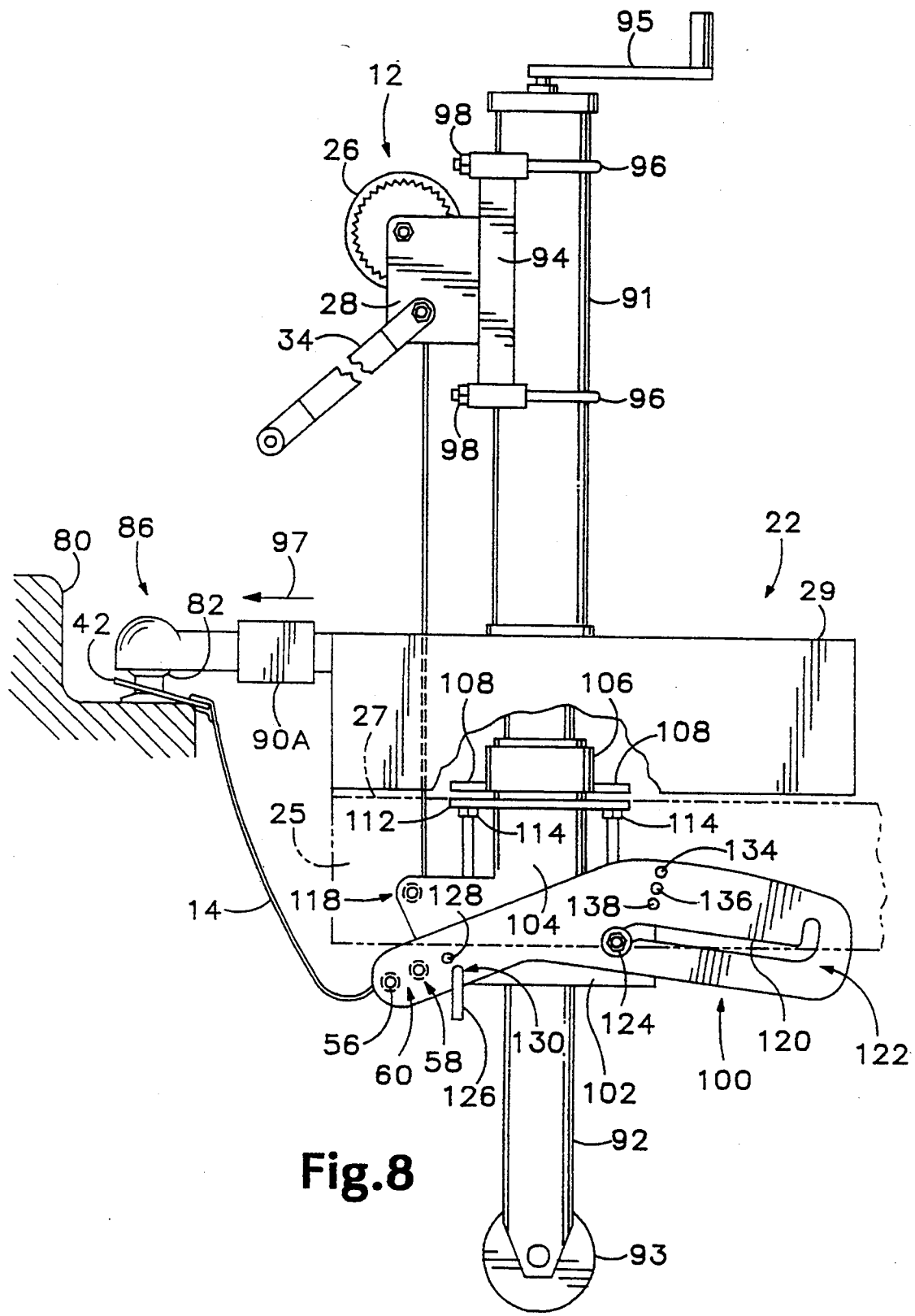
FIG. 8 is a side elevation of the embodiment of the invention shown in FIG. 6 with receiver and ball portions of the hitch assembly coupled and the arms of the attachment unit locked in a storage position.
Figure 9:
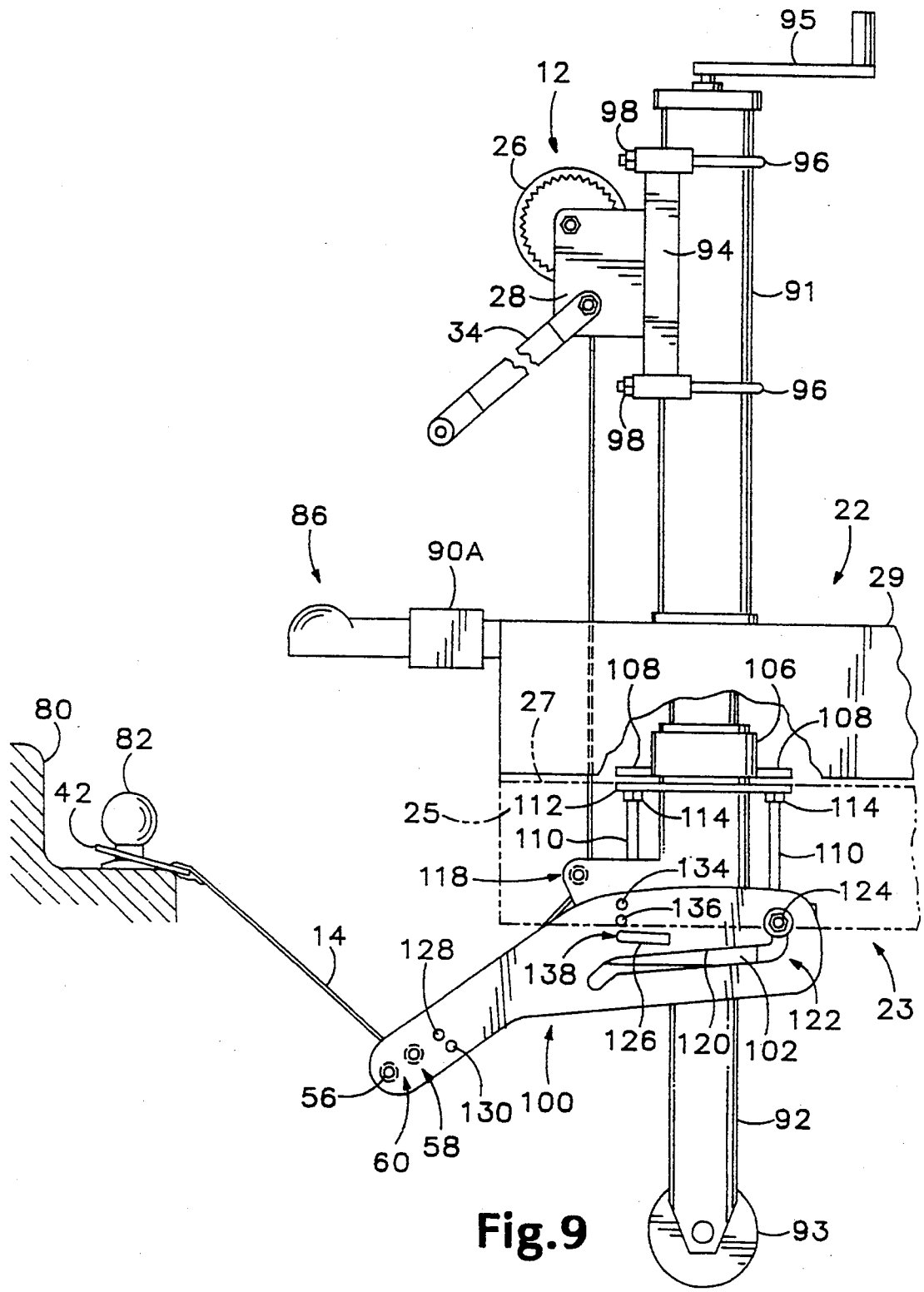
FIG. 9 is a side elevation of the embodiment of the invention shown in FIG. 6 with the guide arms thereof locked in a position to lift a receiver portion of the hitch assembly off a ball portion thereof.

The arm members also each include respective slots 120, each with a bend 122, for mounting the arm members on a mounting shaft 124. This permits the arm to be moved rearwardly to a storage position, as shown in FIGS. 6 and 8, or to a forward, operating position, as shown in FIGS. 7 and 9 and explained hereafter. The arm is locked in position by a locking pin 126 placed through one of two holes 128 and 130 formed in of the arm 100 toward the front thereof and through a hole 132 in the mounting frame 102. In this case, the locking pin 126 shown is an L-shaped shaft, though either type of locking pin shown in the two embodiments may be used in either embodiment without departing from the principles of this invention.

When the arm is moved forward to its operating position, as shown in FIGS. 7 and 9, it is locked in position by placing the locking pin 126 through one of three holes 134, 136 and 138 placed somewhat nearer the back of the arm than the front thereof. Either of holes 130 or 128 may be used to lock the arm 100 in its storage position. Similarly, in this case, any of holes 134, 136 or 138 may be used to place the arm 100 in position for hitching the trailer to the vehicle, or unhitching the trailer, depending upon the circumstances.

Turning to FIG. 7, specifically, the arm 100 is shown locked in its forward position with the attachment member 42 placed over the ball 82 on the vehicle and slack in the strap 14 taken up by the winch 12. In this configuration the arm 100 rides on the strap 14 as the winch reduces the length of strap between the trailer and the vehicle, and thereby pulls the trailer toward the vehicle. As in the case of the first embodiment, the arm guides the trailer to the ball 82 and lifts the receiver mechanism 86 over the ball 82.

Turning specifically to FIG. 8, once the receiver portion 86 of the hitch is placed on the ball portion 82, a sleeve-type locking mechanism 90A, as is commonly known in the industry, is engaged by moving it to a forward position as shown by arrow 97. The arm 100 is then moved to its rearward position and locked in place, and the entire mechanism remains on the trailer while the trailer is drawn by the vehicle.

To unhitch the trailer from the vehicle, slack is let out by the winch and the arm is again moved forward and locked in place, as shown in FIG. 9. The locking mechanism 90A is disengaged and the winch is rotated to take up slack, which lifts the receiver mechanism 86 off the ball 82, after which the tongue of the trailer may be pushed rearwardly or moved to the side and the attachment member 42 removed from the ball 82.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. An apparatus for attaching a trailer having a first hitch portion to a vehicle having a second hitch portion, comprising:
   (a) elongate, flexible connection means for connecting said trailer to said vehicle;
   (b) pulling means, coupled to said connection means, for forcibly reducing the length of said connection means between said trailer and said vehicle; and
   (c) lift means, coupled to said connection means so as to ride on said connection means at a point below said first hitch portion and spaced from said pulling means toward said vehicle, for using the tautness of said connection means to lift and align said first hitch portion over said second hitch portion as said length of said connection means is reduced, said lift means having a first coupling for fixedly attaching said lift means to said trailer and a second coupling for coupling said lift means to said connection means said lift means being substantially rigid between said first coupling and said second coupling.

2. The apparatus of claim 1, wherein said connection means comprises a strap of woven material.

3. The apparatus of claim 1, wherein said connection means includes attachment means for attaching said connection means to said vehicle.

4. The apparatus of claim 3, wherein said second hitch portion comprises a ball, said connection means comprises a substantially-flat strap of woven material and said attachment means comprises a substantially-flat, rigid member having an aperture therethrough for receiving said ball.

5. The apparatus of claim 1, wherein said pulling means comprises a winch.

6. The apparatus of claim 5, wherein said winch is disposed on said trailer.

7. The apparatus of claim 1, wherein said lift means comprises an arm disposed on said trailer and having a first position for riding on said connection means and lifting said first hitch portion over said second hitch portion as said trailer is pulled toward said vehicle by reduction of the length of said connection means, and a second position for riding on said connection means and lifting said first hitch portion off of said second hitch portion as the length of said connection means is reduced.

8. The apparatus of claim 1, wherein said lift means comprises an arm, having a first elongate part connected to said trailer, a second elongate part connected to said trailer, said second part being substantially parallel to said first part, and a bearing member connected between said first part and said second part near the ends thereof opposite their connection to said trailer for riding on said connection means.

9. The apparatus of claim 8, wherein said first and second elongate parts each have bends therein of about 45 degrees.

10. The apparatus of claim 8, wherein said first and second elongate parts are connected to said trailer by a pivotal connection comprising a bolt passing through a rectangular prismatic member attached to said trailer.

11. The apparatus of claim 8, wherein said pulling means comprises a winch, and said winch and said arm are mounted on a single plate for attachment to the bottom of said trailer.

12. The apparatus of claim 8, wherein said trailer includes a substantially-horizontal tongue supporting said first hitch portion and a substantially-vertical columnar jack attached to said tongue, said arm being connected to said jack, and said pulling means comprising a winch connected to said jack above said arm.

13. The apparatus of claim 8, wherein said bearing means comprises a roller.

14. A method for attaching a trailer having a first hitch portion including a lift means to a vehicle having a second hitch portion, comprising the steps of:
   (a) connecting said trailer to said vehicle with an elongate, flexible connection means so as to support said trailer at a first point;
   (b) moving said lift means to a position on said elongate flexible connection means, said position being below said first hitch portion and spaced from said first point toward said vehicle; and
   (c) forcibly reducing the length of said connection means between said trailer and said vehicle by pulling on said connection means thereby using said lift means and the tautness of said connection means to lift and align said first hitch portion over said second hitch portion as said length of said connection means is reduced.

15. The method of claim 14, wherein step (a) includes using a strap of woven material as said connection means.

16. The method of claim 14, wherein said pulling is accomplished using a winch mounted on said trailer.

17. The method of claim 14, wherein said trailer includes a tongue and said lift means comprises an arm mounted on said tongue which extends downwardly and has a bearing for riding on said connection means.

18. An apparatus for attaching a trailer having a first hitch portion to a vehicle having a second hitch portion, comprising:
   (a) elongate, flexible connection means for connecting said trailer to said vehicle;
   (b) pulling means, coupled to said connection means, for forcibly reducing the length of said connection means between said trailer and said vehicle; and
   (c) an arm disposed on said trailer and having a first position for storage, and a second position for riding on said connection means and lifting said first hitch portion over said second hitch portion as said trailer is pulled toward said vehicle by reduction of the length of said connection means, said arm being pivotally attached to the trailer so as to move from said first position for storage to said second position.

19. An apparatus for attaching a trailer having a first hitch portion to a vehicle having a second hitch portion, comprising:
(a) elongate, flexible connection means for connecting said trailer to said vehicle;
(b) pulling means, coupled to said connection means, for forcibly reducing the length of said connection means between said trailer and said vehicle; and
(c) an arm disposed on said trailer and having a first position for storage, and a second position for riding on said connection means and lifting said first hitch portion off of said second hitch portion as the length of said connection means is reduced, said arm being pivotally attached to the trailer so as to move from said first position for storage to said second position.

20. An apparatus for attaching a trailer having a first hitch portion, a substantially-horizontal tongue supporting said first hitch portion and a substantially-vertical columnar jack attached to said tongue, to a vehicle having a second hitch portion, comprising:
(a) elongate, flexible connection means for connecting said trailer to said vehicle;
(b) pulling means, coupled to said connection means, for forcibly reducing the length of said connection means between said trailer and said vehicle; and
(c) an arm, having a first elongate part connected to said trailer, a second elongate part connected to said trailer, said second part being substantially parallel to said first part, and a bearing member connected between said first part and said second part near the ends thereof opposite their connection to said trailer for riding on said connection means, said arm being mounted on said jack by a pin and having slots therein for receiving said pin so-that said arm can be moved along said slots to a storage position at one end of each said slot and to an operating position at the other end of each said slot, said pulling means comprising a winch connected to said jack above said arm.

21. An apparatus for attaching a trailer having a first hitch portion to a vehicle having a second hitch portion, comprising:
(a) elongate, flexible connection means for connecting said trailer to said vehicle;
(b) pulling means, coupled to said connection means, for forcibly reducing the length of said connection means between said trailer and said vehicle; and
(c) lift means, coupled to said connection means, for using the tautness of said connection means to lift and align said first hitch portion over said second hitch portion as said length of said connection means is reduced, said lift means including means for placing said lift means in a first position for riding on said connection means and lifting said first hitch portion over said second hitch portion as said trailer is pulled toward said vehicle by reduction of the length of said connection means, and for placing said lift means in a second position for riding on said connection means and lifting said first hitch portion off of said second hitch portion as the length of said connection means is reduced.

22. An apparatus for attaching a trailer having a receiver hitch portion to a vehicle having a ball hitch portion, comprising:
(a) elongate, flexible, substantially-flat strap of woven material for connecting said trailer to said vehicle;
(b) a substantially-flat, rigid member attached to an end of said strap and having an aperture therethrough for receiving said ball hitch portion;
(c) pulling means, coupled to said strap, for forcibly reducing the length of said strap between said trailer and said vehicle; and
(d) lift means, coupled to said strap, for using the tautness of said strap to lift, guide and align said socket hitch over said ball hitch as said length of said strap is reduced.

* * * * *